US006862024B2

(12) United States Patent
Perry et al.

(10) Patent No.: US 6,862,024 B2
(45) Date of Patent: *Mar. 1, 2005

(54) ENHANCING TEXTURED RANGE IMAGES USING A 2D EDITOR

(75) Inventors: Ronald N. Perry, Cambridge, MA (US); Sarah F. Frisken, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 293 days.

This patent is subject to a terminal disclaimer.

(21) Appl. No.: 10/123,987

(22) Filed: Apr. 17, 2002

(65) Prior Publication Data

US 2003/0197698 A1 Oct. 23, 2003

(51) Int. Cl.$^7$ ............................................. G06T 17/00
(52) U.S. Cl. ...................... 345/420; 345/421; 345/422; 345/424; 345/590; 382/285
(58) Field of Search ................. 345/420, 421, 345/422, 424, 590; 382/285

(56) References Cited

U.S. PATENT DOCUMENTS

2003/0198404 A1 * 10/2003 Frisken et al. .............. 382/285

OTHER PUBLICATIONS

Brian Curless "From Range Scans to 3D Models", Computer Graphics 1999, pp. 38–41.*

* cited by examiner

*Primary Examiner*—Kimbinh T. Nguyen
(74) *Attorney, Agent, or Firm*—Dirk Brinkman; Andrew J. Curtin

(57) ABSTRACT

A method edits a 3D model using 2D images. First, a projected range image is generated from a 3D model. The projected range image is edited using a 2D editor. A projected distance and a cliff distance from a plurality of 3D points to a 3D surface of the 3D model are determined using the edited projected range image. The projected distance and the cliff distance of each of the 3D points are combined to determine a distance from each 3D point to the 3D surface so that the distances forming a distance field of the edited 3D model.

16 Claims, 8 Drawing Sheets

US 6,862,024 B2

ENHANCING TEXTURED RANGE IMAGES USING A 2D EDITOR

FIELD OF THE INVENTION

The invention relates generally to computer graphics, and more particularly to generating and editing the geometry and texture of 3D models acquired from 2D images.

BACKGROUND OF THE INVENTION

In computer graphics, it is often desired to minimize the amount of geometry in a model of a scene or an object to enable efficient rendering of the model. Several effective approaches have been developed to add visual detail to low-resolution models during rendering, such as texture mapping and bump mapping, see Apodaca et al., "*Advanced Renderman,*" Morgan Kaufmann, ISBN 1558606181, 2000.

However, there are times when low-resolution models are insufficient. For example, high-end production studios often require models with detailed explicit geometry for physical simulation, e.g., deformation and collision detection. In addition, these studios often employ sophisticated illumination that requires models with high-resolution geometry.

Displacement mapping can be applied to the low-resolution geometry of an underlying model to provide correct illumination. This is an operation that is usually performed dynamically during rendering and, therefore, precludes using the resultant model with high-resolution geometry for physical simulation. Finally, users, such as artists, designers, engineers and sculptors, may require models with high-resolution geometry in order to produce solid 3D models via 3D printing methods.

Many systems are known for direct modeling of the 3D geometry of scenes and objects. However, generating models with high-resolution geometry is a difficult and time-consuming task. It is often very hard to recreate the complexity and variety of geometric texture that occurs in nature.

High-resolution range scanners, such as Cyberware 3030, provide means for capturing existing geometry but high-resolution scanners are expensive and difficult to transport. In addition, their spatial resolution is limited. Hand-held range scanners are more portable, but they too are expensive for the casual user, and sacrifice both spatial and depth resolution for portability.

In contrast, digital cameras are portable, inexpensive, have a high spatial resolution, and are easy to use. In addition, 2D photograph editing systems such as Photoshop are dramatically simpler to use than 3D modeling systems. However, digital cameras do not provide explicit depth information.

Methods for generating the geometry for 3D models from 2D images have a significant connection to the field of computer vision. Many methods are known in the prior art for extracting shape from shade, shape from focus, and shape from stereo pairs. Szeliski, in "*Determining Geometry from Images*", SIGGRAPH 1999 Course Notes #39, Image-Based Modeling, Rendering, and Lighting, 1999, presents a bibliography and an overview of the various approaches.

Prior work has primarily focused on developing automatic techniques for acquiring an accurate global shape description of objects or scenes. In contrast, it is desired here to capture the spirit of the geometry in a scene using interactive methods by capturing fine geometric detail from a 2D image. Then, a user actively involved in the process can modify and enhance a global shape description of objects or scenes. Thus, the goal of the present invention is quite different from the goal of methods in computer vision.

Although texture synthesis methods, such as described by Efros et al., "*Image Quilting for Texture Synthesis and Transfer,*" SIGGRAPH Proceedings, pp. 341–346, 2001, can be extended to generate synthetic range images, those techniques lack "directability." Directability is a phrase often used in the animation industry for processes that provide precise control over every detail.

The basic prior art approach known for constructing 3D models from range data is shown in FIG. 1. A range scanner 110 acquires range data 102 of a scene or object 101. Hereinafter, the term "scene" 101 means a natural outdoor scene, an indoor scene, or a scene that contains one or more objects, or combinations thereof. Of particular interest are highly textured scenes, for example, a rocky surface, leaves, grass, and the like, and objects with uneven and complex surface structures. The range data 102 can be processed 120 to form range images 103 and range 3D surfaces 104. A method for reconstructing the geometry 130 is used to generate a 3D model 105 from the range images 103 and range surfaces 104.

There are many reconstruction methods in the prior art. A review of these methods is described by Curless, "*From range scans to 3D models*", Computer Graphics, Volume 33, No. 4, 1999. Some methods first determine an implicit representation of the surface, usually in the form of a sampled distance field, and then reconstruct the 3D model as a 3D iso-surface of the implicit representation. Some methods are designed to be very general, e.g., they can accept range data in the form of an unorganized cloud of surface points. Other methods use range data that are available in the form of range images, where range measurements are acquired in a regularly sampled 2D grid.

There are several methods for reconstructing 3D models from range data that make use of distance fields. Some of these methods make the general assumption that data are available only as an unorganized set of surface points. Hoppe et al., in "*Surface Reconstruction from Unorganized Points,*" Proceedings SIGGRAPH'92, pp. 71–78, 1992, generates a regularly sampled signed distance volume by defining local tangential planes from neighborhoods of scanned surface points and computing signed distances to these planes. Marching Cubes, described by Lorensen et al., in "*Marching Cubes: a High Resolution 3D Surface Reconstruction Algorithm,*" Proceedings SIGGRAPH'87, pp. 163–169, 1987, is then used to generate a surface model from the volume representation.

Bajaj et al. in "*Automatic Reconstruction of Surfaces and Scalar Fields from 3D Scans,*" Proceedings SIGGRAPH'95, pp. 109–118, 1995, and Boissonnat et al., in "*Smooth Surface Reconstruction via Natural Neighbor Interpolation of Distance Functions,*" in Proceedings of the 16th Annual ACM Symposium on Computational Geometry, pp. 223–232, 2000, build Voronoi diagrams from scanned surface points. Then, they use the Voronoi diagram to efficiently evaluate closest distances to the surface and to define surface patches for the model.

Carr et al., in "*Reconstruction and Representation of 3D Objects with Radial Basis Functions*", Proceedings SIGGRAPH2001, pp. 67–76, 2001, fit a radial basis function to a set of on-surface and off-surface points derived from scanned surface points. The on-surface points are assigned a value of zero, while off-surface points constructed from the on-surface points are assigned a value equal to their assigned distance from the surface.

All of these methods are quite general because they can be applied to a set of unorganized points. However, when range data are available in the form of range images, it is desired to determine a distance field directly from the range images.

Curless et al., in "A Volumetric Method for Building Complex Models from Range Images," Proceedings SIGGRAPH'96, pp. 303–312, 1996, Hilton et al., in "Reliable Surface Reconstruction from Multiple Range Images," Proceedings of the 4th Eurographics Conference on Computer Vision, pp. 117–126, 1996, and Wheeler et al., in "Consensus surfaces for Modeling 3D Objects from Multiple Range Images," Proceedings of the International Conference of Computer Vision, 1998, present methods that generate a volumetric representation of the distance field from range surfaces, which are generated by connecting nearest neighbors in the range image with triangular facets.

Those methods avoid triangulation over possible occlusions in the model surface by not connecting neighbors with significant differences in range values. That approach is conservative and avoids building surfaces over unobserved regions. However, that method can lead to holes in the model that must be addressed separately as described by Curless et al. Those three methods all use a weighted averaging scheme to combine distance values from multiple scans. As for the method of Hoppe et al., those methods use Marching Cubes to generate a triangle model from the volume representation.

Curless et al. use line-of-sight distances and only compute distances in a limited shell surrounding the surface. The distance volume is run-length-encoded to reduce storage and processing times. Hilton et al. determine Euclidean distances from range surfaces in a limited shell surrounding the surface, and store the results in a regularly sampled volume. Wheeler et al. also determine Euclidean distances from range surfaces, but limit distance evaluations to the vertices of a three-color octree.

Whitaker, in "A Level-Set Approach to 3D Reconstruction from Range Data," the International Journal of Computer Vision, pp. 203–231, 1998, determines line-of-sight distances directly from range images and combines distance values from multiple scans using a windowed, weighted average. Then, he uses level set methods to reduce scanner noise by evolving a surface subject to forces that attract the surface to the zero-valued iso-surface of the distance field, and satisfy a shape prior such as surface smoothness. Zhao et al., in "Fast Surface Reconstruction using the Level Set Method," Proceedings 1st IEEE Workshop on Variational and Level Set Methods, pp. 194–202, 1998, use a method similar to Whitaker, but initialize the distance field used to attract the evolving surface from a set of unorganized points.

Recently Perry et al. in "Kizamu: A System for Sculpting Digital Characters," Proceedings SIGGRAPH 2001, pp. 47–56, 2001 and Sagawa et al., in "Robust and Adaptive Integration of Multiple Range Images with Photometric Attributes," Proceedings IEEE Computer Society Conference on Computer Vision and Pattern Recognition, volume 2, pp. 172–179, 2001, describe methods similar to the method of Wheeler et al., but use adaptively sampled distance fields (ADFs) instead of a three-color octree to reduce the number of distance evaluations required.

ADFs adaptively sample a distance field of a scene or object and store the sample values in a spatial hierarchy, e.g., an octree, for fast processing, see Frisken et al. "Adaptively sampled distance fields: a general representation of shape for computer graphics," Proceedings SIGGRAPH 2000, pp.249–254, 2000. ADFs are memory efficient and detail directed, thus permitting very complex objects to be manipulated on desktop machines. In addition, ADFs are a volumetric representation that can be used to build upon volumetric approaches for reconstructing geometry from range data.

ADFs are described in detail in U.S. patent application Ser. No. 09/370,091, "Detail directed hierarchical distance fields," filed by Frisken at al. on Aug. 6, 1999, incorporated herein by reference. ADF models generated using the present invention can be incorporated into an existing ADF sculpting system that provides an intuitive interface for manually editing the generated ADF, see U.S. patent application Ser. No. 09/810,261, "System and method for sculpting digital models," filed by Perry et al., on Mar. 16, 2001, incorporated herein by reference, and for creating level-of-detail (LOD) triangle models from the ADF, see U.S. patent application Ser. No. 09/810,830, "Conversion of adaptively sampled distance fields to triangles," filed by Frisken et al., on Mar. 16, 2001, incorporated herein by reference.

There also exist several methods for generating 3D models from height fields or elevation maps that are related to the reconstruction of geometry from a single range image, H. Hoppe, "Smooth View-Dependent Level-of-Detail Control and its Application to Terrain Rendering," IEEE Visualization, pp. 35–42, October, 1998. Those methods are focused on providing efficient rendering and effective visualization, but not towards subsequent editing, as desired here.

Therefore, it is desired to combine the advantages of inexpensive digital cameras and 2D editing systems to provide a simple, fast, and cost-effective method for generating the geometry and detailed texture for 3D models directly from 2D images.

SUMMARY OF THE INVENTION

It is an object of the invention to provide a method for acquiring textured range images from 2D photographs.

It is also an object of the invention provide a method for computing distances from range images in order to convert the textured range images interactively to 3D models.

It is also an object of the invention to provide an interactive method for acquiring detailed geometry and texture for 3D models using a digital camera and a 2D image editor.

Although these methods can be worked alone, e.g., the textured range image produced by the interaction method can be converted to 3D models by reconstruction methods that use other means to compute distances, the combination of the methods provides a means for generating detailed 3D models that is cost-effective, (e.g., by using inexpensive digital cameras and significantly reducing labor), practical, (e.g., cameras can go many places range scanners cannot), approachable, (e.g., cameras and 2D editors are simple to use, while range scanners and 3D modelers are not), robust (e.g., hole-free, water-tight models are produced), and efficient (e.g., model generation takes seconds on a desktop machine).

Therefore, the invention provides a method to construct the geometry and surface texture of 3D models from range images. More specifically, the range image can be highly textured. The method can be applied to a single image or multiple images. The method is fast and memory efficient, and provides water-tight, hole-free models, which can be trivially sculpted in 3D to repair occluded regions.

The invention also provides an interactive method for generating 3D models from images acquired by an inexpensive digital camera. The method generates textured range images from photographs. The textured range images can be used, with a construction process, as a simple and effective way to generate the geometry and texture of models with exquisite detail.

These two methods can be combined with a 3D digital sculpting system to provide a powerful new design approach for generating and editing detailed 3D models.

More particularly, the invention edits a 3D model using 2D images. First, a projected range image is generated from a 3D model. The projected range image is edited using a 2D editor. A projected distance and a cliff distance from a plurality of 3D points to a 3D surface of the 3D model are determined using the edited projected range image. The projected distance and the cliff distance of each of the 3D points are combined to determine a distance from each 3D point to the 3D surface so that the distances forming a distance field of the edited 3D model.

DETAILED DESCRIPTION OF THE PREFERRED EMBODIMENTS

Projected Distances

Figure 1:
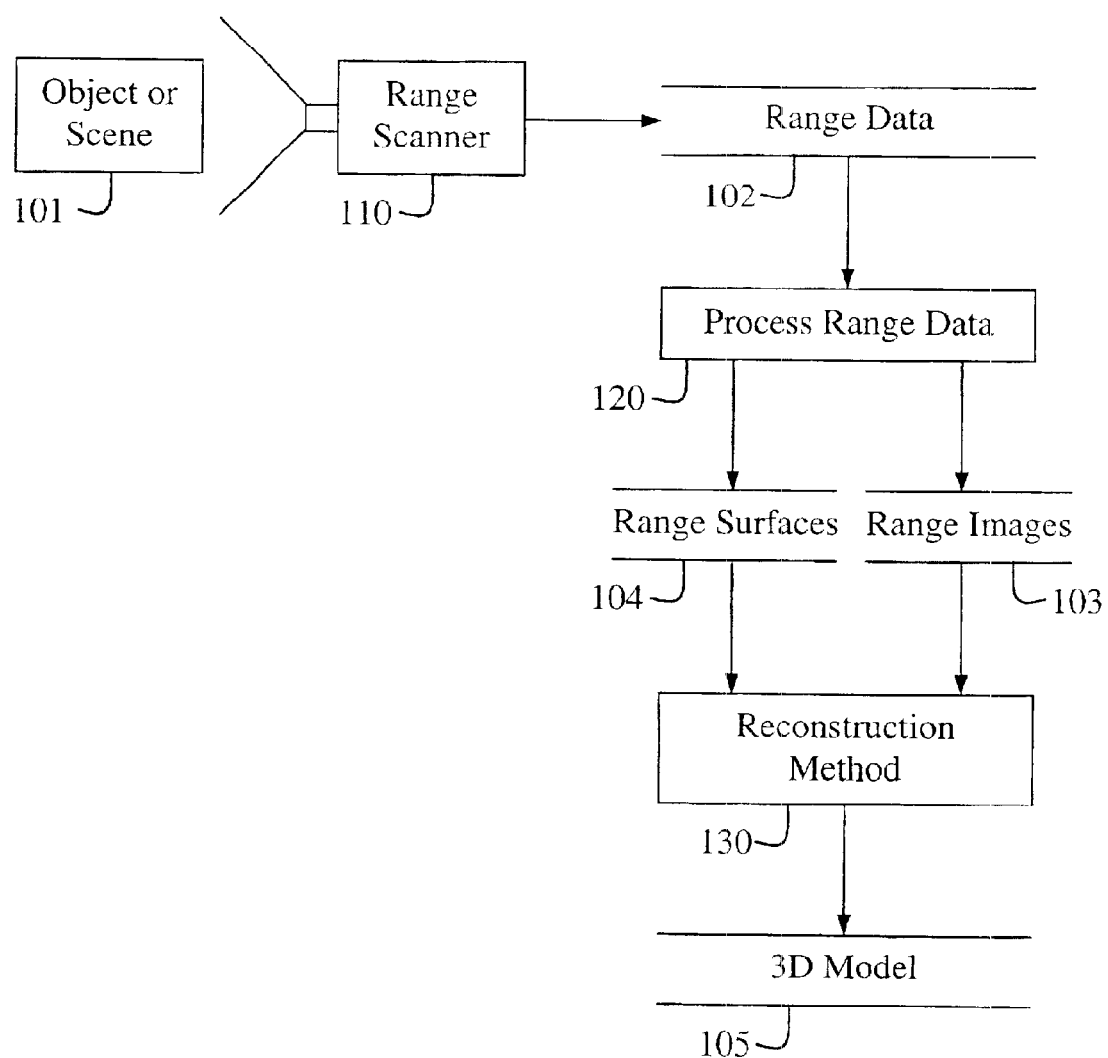
FIG. 1 is a flow diagram of a prior art method for converting 2D range data to 3D models.

Two-dimensional (2D) range images provide a 2D grid of line-of-sight distances from a scanner to an object. A line-of-sight distance is measured along a viewing ray from the scanner to the object. In the following description, we assume that each distance value in the range image represents a perpendicular projected distance, where the distance is measured along a ray from the scanner to the object that is perpendicular to the plane of the scanner, also see U.S. Pat. No. 6,262,738 issued to Gibson, et al. on Jul. 17, 2001, "Method for estimating volumetric distance maps from 2D depth images," incorporated herein by reference, for further details on this problem.

Scanning systems do not always provide projected distances but conversion to this form can be straightforward. As an example, laser striping systems "fan" a laser beam into a plane of laser light so that each scan line of the range image samples line-of-sight distances along rays radiating from the point laser source to the object. Given the geometry of the laser striping system and an angle of each ray to the laser source, these line-of-sight distances can be converted to projected distances and mapped back onto the plane of the scanner. Resampling these mapped projected distances into a regular grid provides the required projected range image. This conversion can result in some loss of data near occluded regions, however, the loss is usually small.

Euclidean Distances

Curless et al. use line-of-sight distances, while Whitaker uses projected distances in their distance-based reconstruction methods, see above for citation. Our method determines Euclidean distances because Euclidean distances provide a more accurate representation of both the direction to the surface for points that are not on the surface, and of the surface itself when combining multiple scans. Euclidean distances permit faster generation of an adaptively sampled distance field (ADF), and provide better compression of the distance field in the ADF, thus enabling the representation of high resolution models.

The projected distance can vary significantly from the Euclidean distance in two ways as shown in FIG. 2. First, when a surface 201 is at an angle 204 to a scanning direction 202, the true distance value 203 is smaller than the projected distance value 202. Second, the range image does not represent distances to occluded surfaces and surfaces that are nearly parallel with the scanning direction.

At such surfaces, projected distances in the range image are discontinuous and result in an interface in the projected distance field where large positive and large negative distances can be located in adjacent samples. While the projected distance field has the same zero-value iso-surface as the Euclidean distance field, the gradient of the projected distance field differs from the gradient of the true Euclidean distance field. This can be problematic for methods that use the distance field gradient to evolve a surface towards the zero-value iso-surface.

In addition, when multiple range images are combined, projected distances from different view directions are scaled differently. If the distances from all scans are linearly averaged, then the resultant zero-valued iso-surface of the combined projected distances still represent the object surface accurately. However, most methods use a windowed, weighted, non-linear averaging of distance values from different scans. This results in artifacts in the surface where two scans overlap.

In addition to accuracy, there are practical reasons for preferring Euclidean distances when using ADFs. First, when one is primarily interested in the distance field near the surface, cell subdivision can be terminated early during ADF generation when a cell is guaranteed not to contain the surface. With Euclidean distances, where distance values are proportional to cell size, it is easy to determine if a cell does not contain the surface from the cell's distance values. For example, if every cell distance value has the same sign AND the absolute magnitude of every cell distance value is greater than one half the cell diagonal, then the cell is either interior or exterior, and does not intersect the surface.

However, projected distances are not proportional to cell size. Instead, projected distances are scaled depending on the angle of the surface to the scanning direction and are discontinuous near occluded surfaces. Hence, using projected distances precludes the use of terminating cell subdivision early and typically requires more than an order of magnitude more distance evaluations and significant temporary storage during ADF generation. Another reason for preferring Euclidean distances is that with a projected distance field, discontinuities in the projected distance field near occluded surfaces force cells near these occluded surfaces to be subdivided to the highest level of the ADF. This results in increased memory requirements similar to that of a three-color octree.

Correcting Projected Distances

Figure 2B:
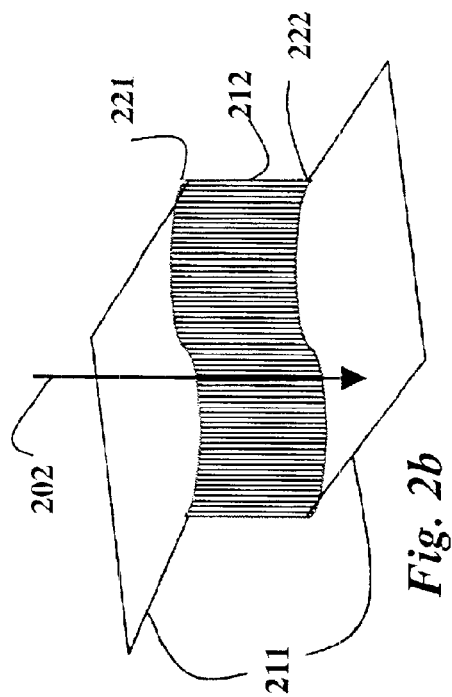
FIG. 2b is a diagram of a discontinuous surface with a cliff.
Figure 2A:
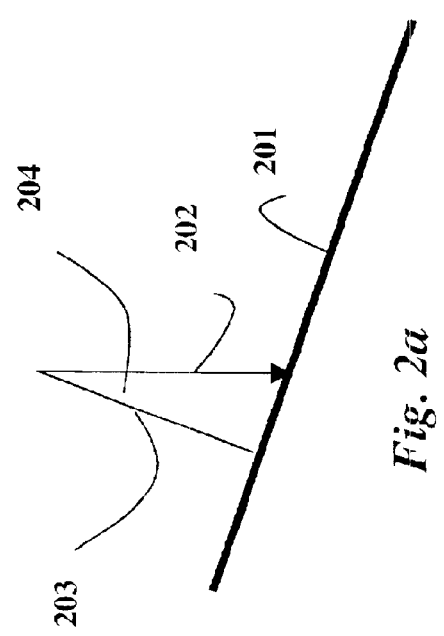
FIG. 2a is a diagram of projected and Euclidean distances.

As shown in FIG. 2a, for points near a planar surface 201, the Euclidean distance 203, $d_t$, is equal to the projected distance 202, $d_p$, multiplied by $\cos(\theta)$ where $\theta$ 204 is the angle between the scanning direction and the surface normal, i.e., $d_t = d_p * \cos(\theta)$. Given a plane with equation $Ax+By+Cz+D=0$ and normal $(A, B, C)$ 203, the projected distance, $d_p$, from a point $p=(p.x, p.y, p.z)$ to the plane along the z direction is $$d_p = p.z - (-p.x*A/C - p.y*B/C - D/C).$$

Differentiating, the gradient of the projected distance field, $\nabla(d_p)$, is $$\nabla(d_p) = (A/C, B/C, 1), \text{ with magnitude,}$$

$$|\nabla(d_p)| = (A^2 + B^2 + C^2)^{1/2}/C.$$

Thus, $|\nabla(d_p)| = 1/\cos(\theta)$ because the normal to the plane is $(A, B, C)$. Hence, for planar surfaces, $d_t = d_p * \cos(\theta) = d_p/|\nabla(d_p)|$, i.e., we can correct the projected distance field near relatively planar regions of the surface by dividing the projected distance by a magnitude of a local gradient of the projected distance field. This correction results in a better approximation of the Euclidean distance near smooth surfaces.

Making this correction for a regularly sampled volume is straightforward but slow. We sample the projected distance field for each point in the 3D volume to generate a projected distance volume and then correct the projected distance at each sample point by dividing by the local gradient magnitude computed using, for example, central differences.

A method for generating a volumetric distance map from projected range images that corrects projected distances with the gradient magnitude is described in U.S. patent application Ser. No. 09/809.682 "System and method for correcting range data to 3D models," filed by Frisken et al., on Mar. 16, 2001, incorporated herein by reference. However, that method first generates a distance volume of the object and determines the magnitude of the 3D gradient from the distance volume.

In contrast, our method does not require a distance volume. Instead, the gradient magnitude is determined directly from the 2D range image, or from a 2D gradient magnitude correction image that is determined directly from the 2D range image. In the direction perpendicular to the range image, the projected distance to the object decreases at a constant rate. Hence, the gradient of the projected distance field is constant along rays perpendicular to the range image. This means that the gradient of the 3D projected distance field can be fully represented by a 2D field in the plane of the range image. This 2D field and the associated gradient magnitude of the 3D projected distance field can be determined for each image point and stored in a 2D gradient magnitude correction image as follows.

Allocate storage for a gradient magnitude correction image of the same dimensions as the range image. Then, for each pixel in the range image, determine a local 2D gradient, $(dx, dy)$, of the range image using a method such as central differences, determine the gradient of the 3D projected distance for this pixel as $(kx*dx, ky*dy, 1)$, where kx and ky are scales related to the size of the image, e.g., kx is the width of range image and ky is the height of range image, determine the inverse gradient magnitude as one divided by the magnitude of the gradient of the 3D projected distance, and store the inverse gradient magnitude in the gradient magnitude correction image.

Hence, the projected distance value can be derived directly from a range image and corrected using a value interpolated from the gradient magnitude correction image.

Correcting Distances Near Cliffs

Range values are discontinuous between pixels in the range image near occluded surfaces and surfaces that run nearly parallel to the scanning direction. Prior art methods that use range surfaces handle these discontinuities by not triangulating over these pixels. However, this results in holes in the range surface and possibly in the resultant 3D model that must be specially treated, or addressed separately.

Here, as shown in FIG. 2b, instead of discarding data near these discontinuities, we make the assumption that a surface 211 is continuous across a range image discontinuity, and forms a cliff 212 that runs nearly perpendicular to the range image and connects pixels on each side of the discontinuity. This approach eliminates holes in the reconstructed surface and provides a reasonable guess at regions of the surface for which there is no data available. Note that this method does not necessarily provide accurate distances to occluded surfaces. However, we assign a low priority to distances computed for cliffs when combining multiple scans so that distances from range images with better views of an occluded region are favored over cliff distances.

Figure 3:
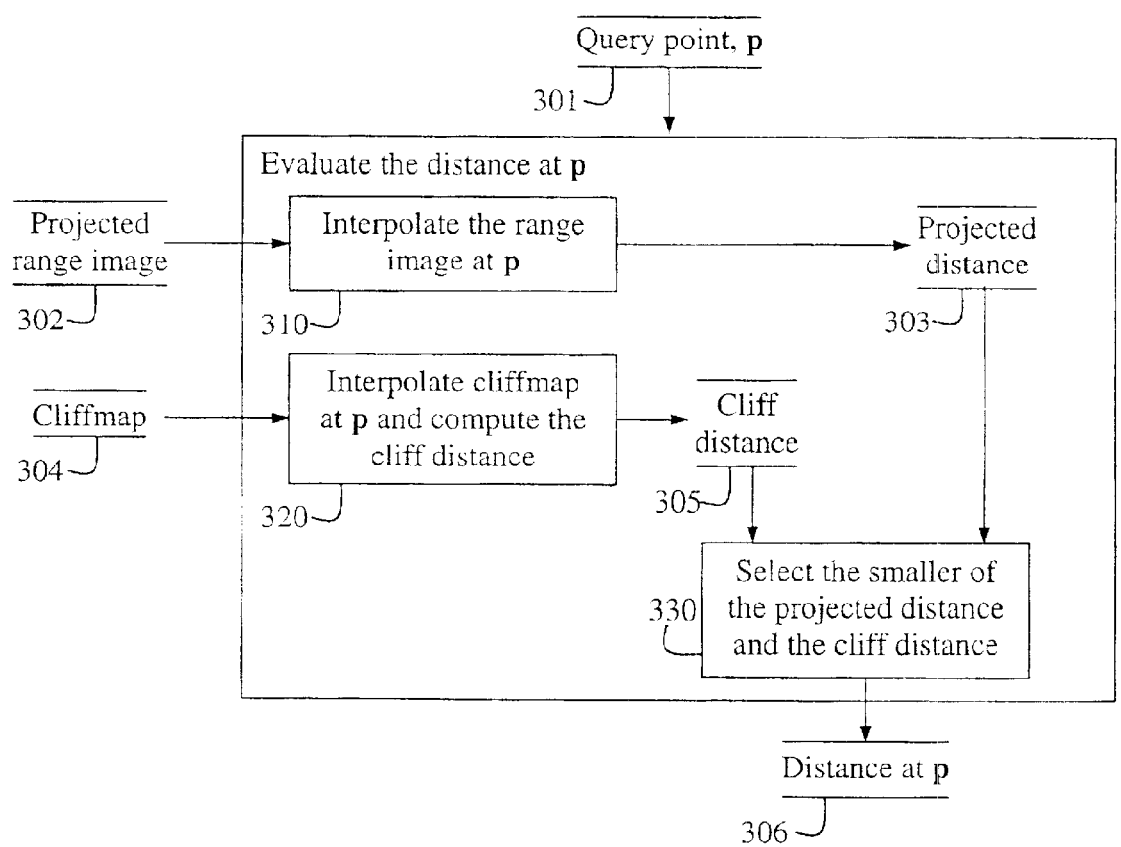
FIG. 3 is a flow diagram of a method for determining a distance to a surface from a range image using a projected range distance and a distance to a cliff according to the invention.

As shown in FIG. 3, a distance 306 to a 3D surface at a 3D query point p 301 is determined as follows. Determine the projected distance 303 by interpolating 310 a 2D projected range image 302. The projected range image can be acquired by a line-of-sight range scanner, e.g., a camera or the z-buffer of a graphics processor. Determine a cliff distance 305. As described below, the cliff distance can be determined by interpolating 320 a cliffmap 304. Finally, combine 330 the projected distance 303 and the cliff distance 305 to determine the distance 306. The combining method 330 can select the smaller of the projected distance 303 and the cliff distance 305.

Cliff pixels, which are pixels that are beside a discontinuity in the range image, can be detected and marked in the range image during a pre-processing step. However, computing cliff distances from these cliff pixels using existing methods is still a time consuming operation. Recall that we propose using cliff distances to remove discontinuities in the 3D distance field in order to reduce generation times. Even if cliff pixels are binned in a spatial hierarchy and a fast search technique is used to locate nearest cliff pixels, this approach does still not provide a significant improvement over simply requiring complete three-color octree subdivision of the ADF along the cliffs.

Fortunately, 3D cliff distances can be estimated from an annotated 2D image, or the cliffmap 304, that can be computed prior to generation. From FIG. 2b, the cliffmap encodes distances to the top 221 and bottom 222 of the nearest cliff 212 in the surface 211 for each pixel in the range image as well as the heights, i.e., the projected range values, of the top and bottom of the cliff 212.

Figure 4:
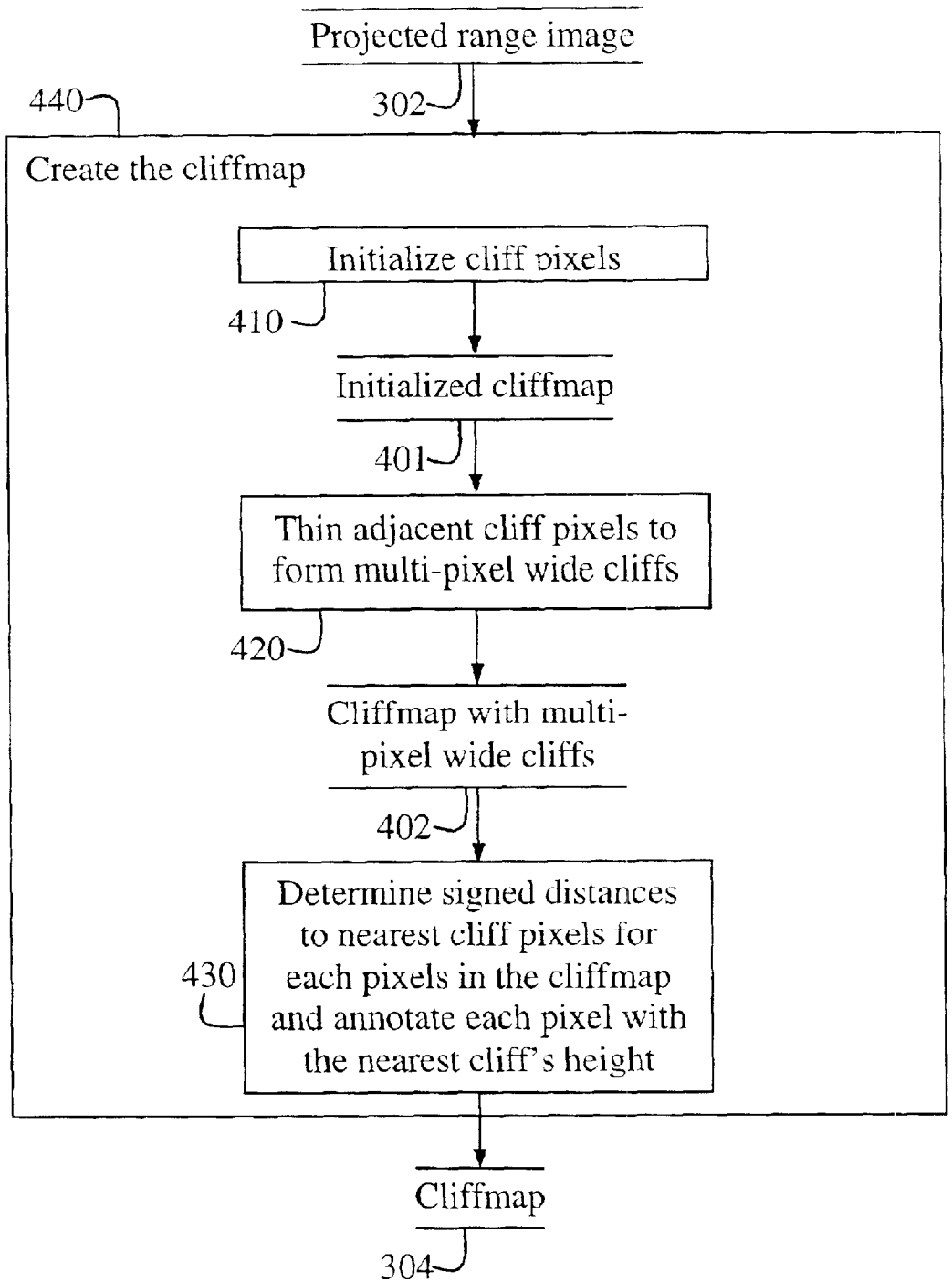
FIG. 4 is a flow diagram of a method for generating a cliffmap from a projected range image according to the invention.

FIG. 4 shows a method 440 for determining the cliffmap 304 for a projected range image 302. First, allocate storage for two distance values and two cliff heights for each pixel in the projected range image 302. Initialize 410 cliff pixels to determine an initialized cliffmap 401. The initial cliff distances for each pixel are set to the largest possible positive value. Then, for each pixel in the range image, determine if the pixel is a top and/or bottom cliff pixel by looking at the pixel's range value relative to range values of adjacent pixels. If the difference between adjacent range values is greater than a predetermine threshold, a discontinuity in the surface can be assumed. If the pixel is a cliff top or a cliff bottom pixel, set the corresponding (top or bottom) cliff distance(s) to zero and the corresponding cliff height(s) to be the pixel's range value.

Contiguous 1-pixel wide cliffs can be reduced 420 to a single multi-pixel wide cliff 402 by setting pixels tagged as both top and bottom cliffs to non-cliff pixels, e.g., by setting both their cliff distances to large positive value.

Finally, determine 430 the cliff distances and cliff heights for all non-cliff pixels in the cliffmap 304. This can be done by first setting unsigned distances to closest cliff pixels together with the corresponding cliff heights using a distance transform, e.g., a 3×3 neighborhood Euclidean transform, and second negating cliff distances for pixels that are on the outward side of a cliff.

To determine the cliff distance 305 from the query point 301, to the nearest cliff using the cliffmap 304, first obtain, e.g., by interpolating the cliffmap 304, the distances to the closest cliff top and cliff bottom and the corresponding heights of the cliff top and cliff bottom. Next, determine whether the query point 301 is closest to the top of the cliff, the bottom of the cliff, or the face of the cliff by comparing the range value of the query point 301 to the heights of the cliff top and bottom. If the query point is above the cliff top, then the cliff distance is determined as the distance to the top of the cliff. If the query point is below the cliff bottom, then the distance is determined as the distance to the bottom of the cliff. Otherwise, the query point 301 is closest to the face of the cliff, and the distance is determined as the distance to a line connecting the cliff top to the cliff bottom.

Estimating the Euclidean Distance

Figure 5:
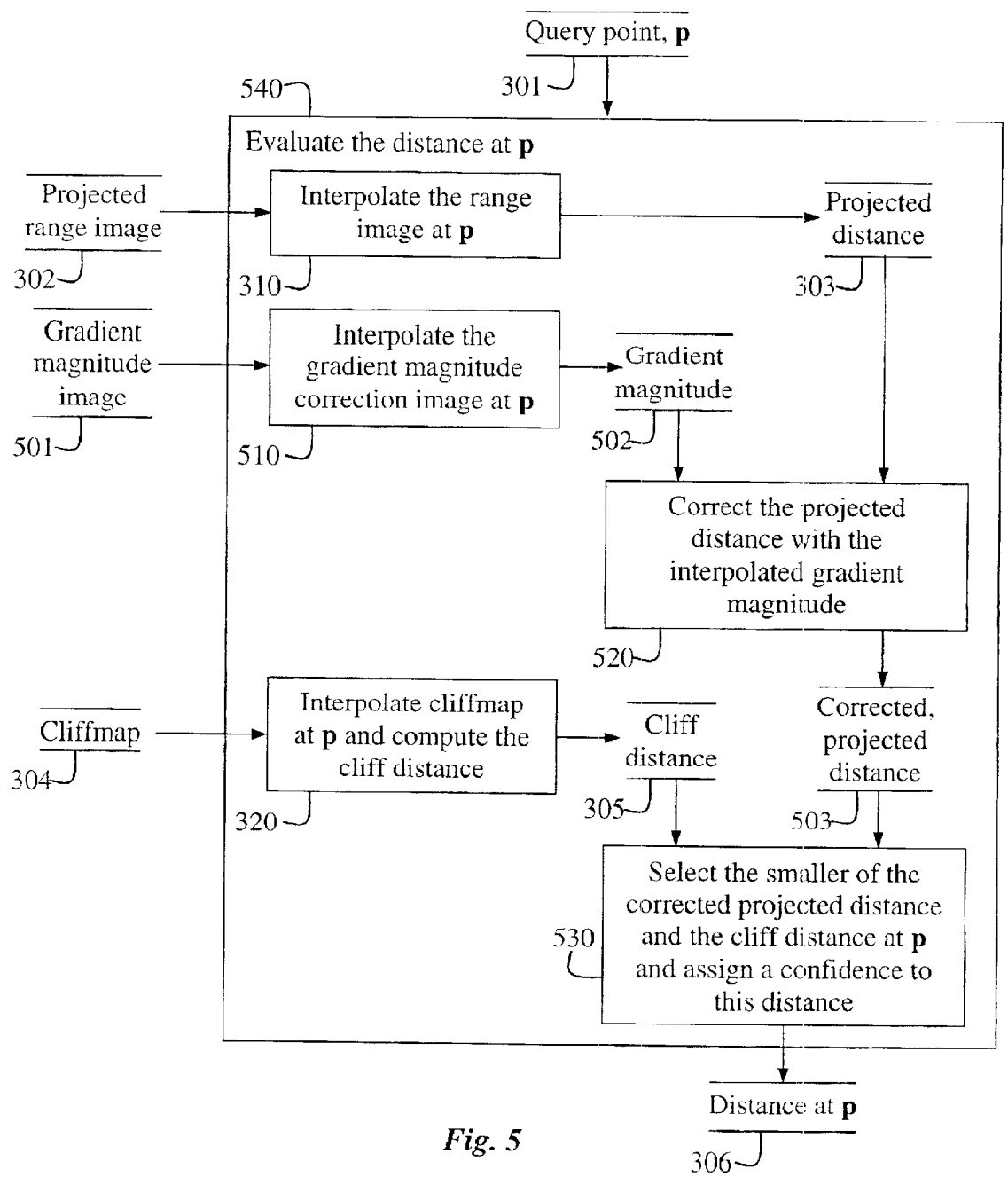
FIG. 5 is a flow diagram of a method for determining a distance to a surface from a range image using a corrected projected range distance, a distance to a cliff, and a gradient magnitude image according to the invention.

FIG. 5 shows the steps 540 to determine the Euclidean distance 306 at the query point 301 for a single range image. The projected distance 303 is interpolated 310 from the projected range image 302. The associated gradient magnitude 502 is interpolated 510 from the gradient magnitude correction image 501. The projected distance is corrected 520 with the gradient magnitude 502 to determine the corrected projected distance 503. The distance 305 to the nearest cliff is determined 320 using the cliffmap 304. Finally, the smaller of the corrected projected distance and the cliff distance is selected 530 to determine the distance 306.

Combining Multiple Range Images

Distances from multiple scans can be combined in several ways depending on the method used for reconstructing surfaces. For example, one could use any of the weighted averaging schemes described by Curless et al., Hilton et al., Wheeler et al., and Whitaker, see above for citation. The best combining method is determined by the noise characteristics of the range scanner and any further processing applied by the reconstruction method.

For example, a simple combining scheme selects a 'best' distance value from multiple scans, where 'best' means that small distances are favored over large distances, distances with small gradient magnitudes are favored over distances with large gradient magnitudes, and corrected projected distances are favored over cliff distances.

Generating an Adaptively Sampled Distance Field

Figure 6:
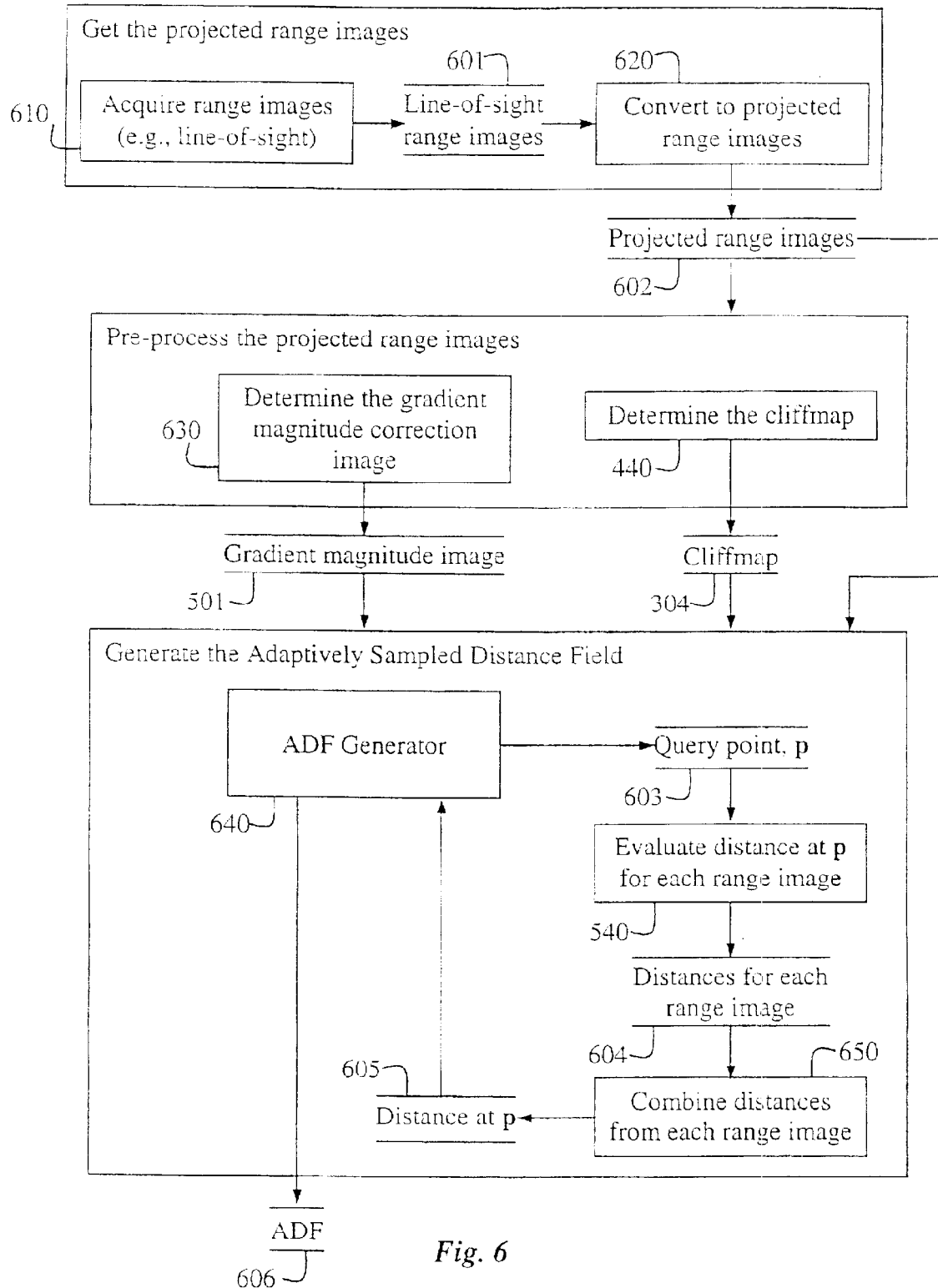
FIG. 6 is a flow diagram of a method for generating an adaptively sampled distance field of a scene from a range image according to the invention.

FIG. 6 shows the steps for generating an ADF of the Euclidean distance field. First, range images 601 are acquired 610, and converted 620 to projected range images 602. These projected range images are pre-processed to determine 630 the gradient magnitude correction image 501 and to determine 440 the cliffmap 304.

Starting from the root cell of the ADF, the ADF generator 640 recursively subdivides the cells of the ADF 606 using an error-based subdivision predicate until the field within the cell is well described by the cell's 8 distance values. Distances at each ADF query point 603 are evaluated 540 for each range image to produce distances for each range image 604 that are combined 650 to determine the distance 605 at point p. For this application, surface-centric ADFs that limit subdivision to cells bounding the surface and do not subdivide exterior or interior cells beyond a minimum level in the ADF hierarchy are used.

We also use the method as described above to generate the geometry from a textured range image produced by an interactive method described below.

Figure 7:
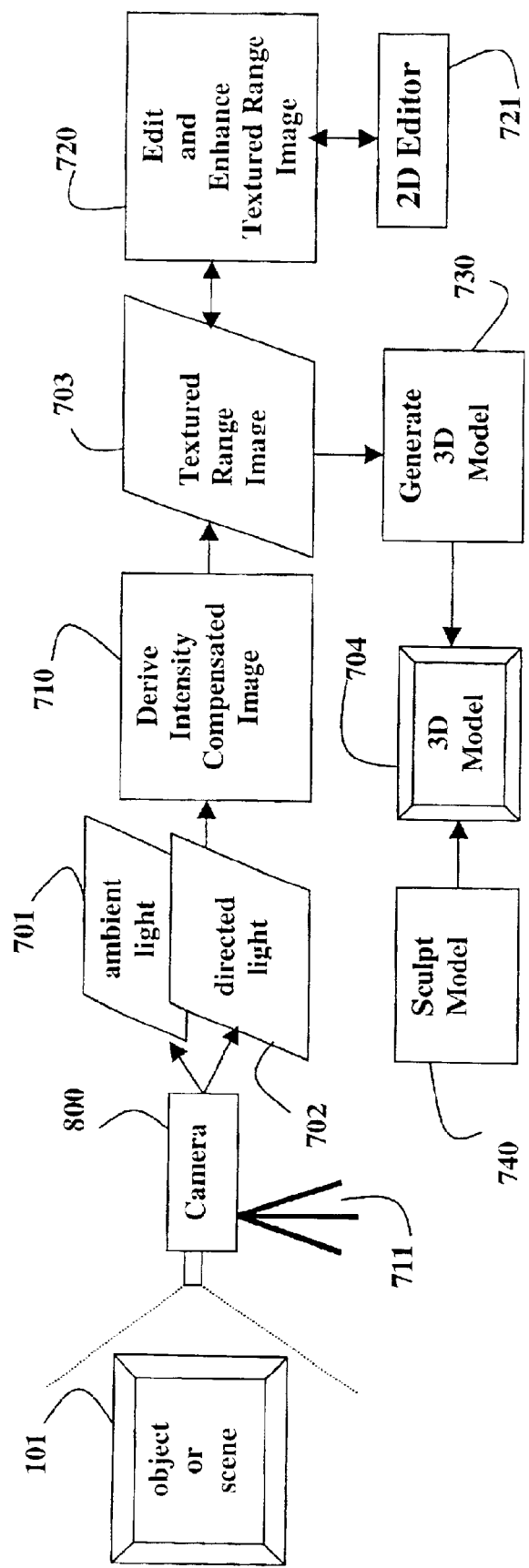
FIG. 7 is a flow diagram for generating a textured range image according to the invention.

Generating Textured Range Images from Photographs
Extracting Detailed Geometric Texture from Photographs As shown in FIG. 7, we also provide an interactive method for generating range images from a pair of photographs, that is, two 2D images without explicit depth information. However, instead of using a pair of stereo images that are offset from each other, as is typically done in the prior art, our images, surprisingly, are substantially aligned on the same optical axis. That is, the two photographs are taken from substantially the identical point of view.

A first image 701 is taken of the scene 101 with a camera 800 under ambient lighting. The camera 800 is described in greater detail below. With the camera 800 at the same location, a second image 702 is taken with directed lighting, for example, a flash substantially co-located with the lens of the camera 800.

An intensity compensated image is derived 710 from the pair of photographs 701–702. We call this image a textured range image 703. A user can optionally edit and enhance 720 the textured range image 702 using a 2D image editor 721. A 3D model 704 is then generated 730 from this enhanced textured range image 703 using the method described above. The last two steps can be repeated until the desired result is achieved.

Compensating for Intensity Variation Using Directed Lighting

Photographs contain a great deal of information about the geometry and texture of an object or scene. For example, in a photograph of a stone wall, cracks between the stones are darkened by shadows, while protruding parts of the stones appear brighter. This is a common phenomenon when the first image 701 that is acquired of the scene 101 is illuminated by ambient light. Highlights tend to brighten raised portions of a surface, and shadows tend to darken recessed portions of the surface. Light and dark intensity variation in the surface often dominate this effect.

However, in a photograph taken with direct light, the recessed and raised portions of the photograph tend to be illuminated much more evenly. Because the lens and flash are substantially co-located, there are almost no shadows present in the image 702 acquired under direct lighting conditions. In contrast with prior art stereoscopic pairs of images, the second image is essentially acquired from the identical point of view.

The second photograph 702 records light intensity variation of the scene without the depth cues provided by shadows in the naturally illuminated first photograph 701. This suggests using the flash image 702 to compensate 710 for intensity variation in the ambient lighted photograph 701.

Therefore, we compensate 710 for intensity variation by dividing the luminance of each pixel of the ambient lighted image 701 by the luminance of the corresponding pixel in the directly lighted image 702 to obtain the intensity compensated image 703. We perform intensity compensation using floating point arithmetic to avoid discretization artifacts. In the intensity compensated image, the intensity variation has been eliminated, but the depth cues remain. In fact, we use the intensity compensated image as an approximate textured range image to generate 740 the 3D geometry of model 704 of the scene 101.

Experimenting with different cameras and different lighting, we make the following observations. First, we find that "ambient lighting" encompasses a broad range of lighting conditions including outdoor and indoor lighting, sunny and overcast conditions, and images taken in a shadow or in sunlight. All that is required is that shadows in the scene emphasize the desired detailed geometry and that the direct light dominates background lighting, particularly during short exposures.

Any number of exposure and film settings could be used, however, we find that photographs taken using the defaults automatic exposure settings of the camera 800 typically achieve the best results. The best results are achieved when the highest possible resolution image is used, i.e., image compression is disabled.

If the camera 800 is mounted on a tripod 711, then there can be a delay between acquiring the ambient and flash images, and the two images are still substantially aligned. Alternatively, the camera can be configured to take the ambient and flash image in rapid succession, so that camera motion is negligible, even when the camera is hand-held. It is also possible to take a sequence of pairs of images using a video camera, and generate a sequence of intensity compensated images. This can provide an interesting new source for producing animations. For example, if the video camera takes 60 frames per second, then this will produce 3D textured range images or 3D video. This is adequate for most animation.

We compared two digital cameras, a Nikon Coolpix 775, which is a reasonable quality consumer camera with 8-bits per channel resolution, and a Canon D30, which is a high-end professional camera with 12-bits per channel resolution. We are able to achieve very good results with both cameras and find that the textured range images obtained with the lower resolution camera suffice for most applications.

Enhancing Textured Range Images Using a 2D Editor

In an interactive method, the textured range image or 3D model 703 is enhanced with the 2D image editor 721, such as Adobe Photoshop, to clean up and enhance features. For example, white pixels that occur where there were shadows in the flash image 702 can be removed.

The textured range image 703 can also be enhanced by the 2D image editor 721 by combining it with directed gradient filters to enhance the shape or curvature of selected features in the textured range image, with images such as elevation maps, height fields, or range images to provide global shape for the 3D model 704, and by other images such as procedurally generated images to add synthetic texture to the 3D model.

In addition, the textured range image 703 can be enhanced in the 2D image editor using 2D image brushes that locally affect the range values. For example, gradient-based brushes can be used to raise or lower local regions of the 3D model, brushes with a procedural-based texture can be used to add local texture detail, and brushes derived from range images such as textured range images or elevation maps could be used to add local features. For example, a brush with pixel values representing the elevation data for a mountain could be used to add a mountain range to the 3D model by swiping the mountain brush over the textured range image.

Enhancing the textured range image 702 is fast and easy because of the sophisticated tools available for image editing. This editing process produces the enhanced textured range image, which can be converted 730 to the 3D model 704 using the above described method. The conversion only takes a few seconds, thereby providing an effective feedback loop for design.

Final 3D Editing

When satisfied with the results of the interactive editing described above, we can then sculpt 740 the model 704 in 3D using the ADF sculpting system to edit features, that are impossible to edit in 2D, e.g., deep recesses and large overhangs.

3D Camera for Acquiring Textured Range Images

Figure 8:
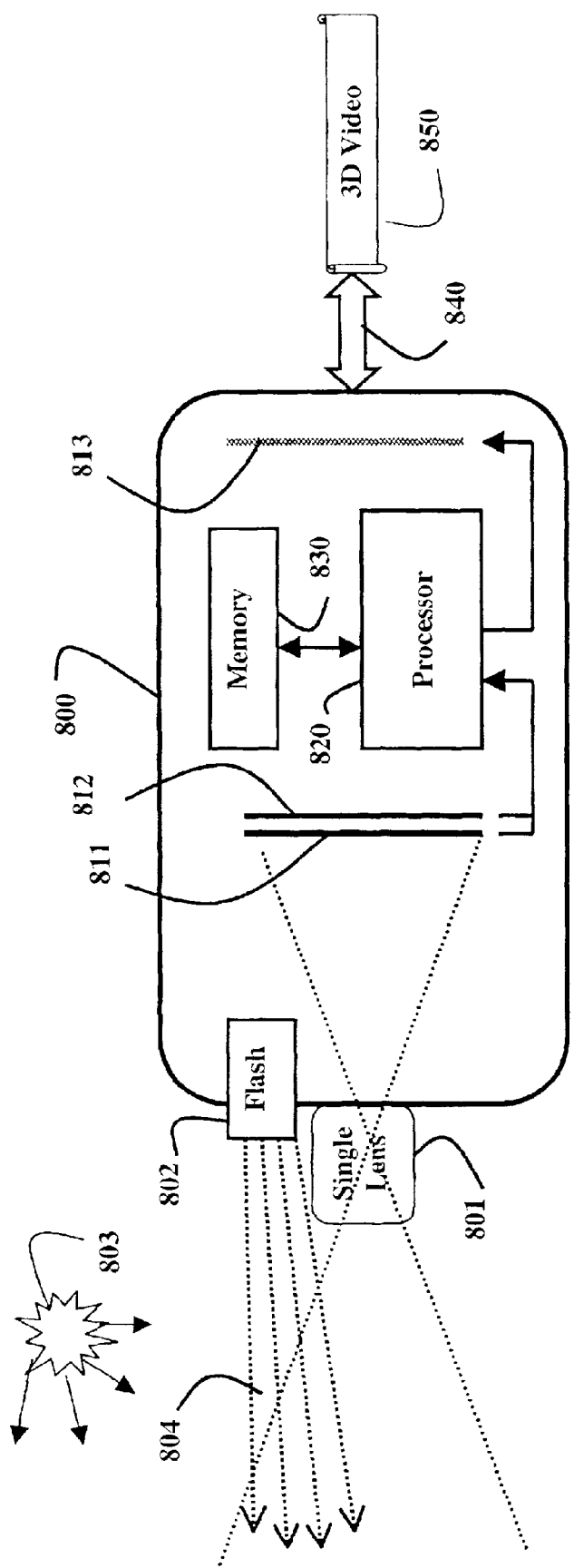
FIG. 8 is a schematic of a camera for acquiring textured range images according to the invention.

FIG. 8 shows the camera 800 in greater detail. The camera 800 has a single lens 801, and a flash 802 substantially co-located with the lens 801. A first image 811 is acquired with ambient light 803, and a second image 812 with the flash 802 producing directed light 804. The order of acquiring the images is not important. The images 811–812 are stored in a memory 830. A processor 820 performs the intensity compensation as described above to generate the textured range image 813. The intensity compensation is performed by dividing the luminance of each pixel of the ambient lighted image 811 by the luminance of the corresponding pixel in the directly lighted image 812 to obtain the intensity compensated image 813. The textured range image 813 can than be exported to other systems via an interface 840, e.g., a USB port. It should be noted that the camera can take a sequence of images to produce a 3D video 850.

Effect of the Invention

We have described interactive methods for acquiring 3D geometry and texture using an inexpensive digital camera. The method generates textured 3D range images from 2D photographs that can be used to generate geometry and texture with exquisite detail. We have also described a method for reconstructing 3D geometry from range images. The combination of these two techniques provides a means for generating detailed 3D models that is cost-effective, practical, approachable, robust, and efficient.

We claim:

1. A method for editing a 3D model using 2D images comprising:

generating a projected range image from a 3D model;

editing the projected range image using a 2D editor;

determining a projected distance from a plurality of 3D points to a 3D surface of the 3D model using the edited projected range image;

determining a cliff distance from the plurality of 3D points to a nearest cliff of the 3D surface using the projected range image; and combining the projected distance and the cliff distance of each of the 3D points to determine a distance from each 3D point to the 3D surface, the plurality of distances forming a distance field of the edited 3D model.

2. The method of claim 1 wherein the projected range image is acquired with a scanner.

3. The method of claim 2 wherein the scanner is a camera.

4. The method of claim 1 wherein the projected range image is derived from a z-buffer of a graphics processor.

5. The method of claim 1 wherein a plurality of projected range images generated from the 3D model are edited and combined to determine the distance field.

6. The method of claim 1 wherein the editing comprises combining the projected range image with other images.

7. The method of claim 1 wherein the editing comprises combining the projected range image with 2D gradient filters.

8. The method of claim 1 wherein the editing comprises editing the projected range image with 2D brushes.

9. The method of claim 8 wherein the 2D brushes are gradient-based brushes.

10. The method of claim 8 wherein the 2D brushes are procedural brushes.

11. The method of claim 8 wherein the 2D brushes are derived from arbitrary projected range images.

12. The method of claim 1 wherein the distance field is stored in a regularly sampled volume.

13. The method of claim 1 wherein the distance field is stored in an adaptively sampled distance field.

14. The method of claim 12 wherein the regularly sampled distance field is used to determine an adaptively sampled distance field.

15. The method of claim 12 wherein a surface model of the 3D surface is determined from the regularly sampled volume.

16. The method of claim 13 wherein a surface model of the 3D surface is determined from the adaptively sampled distance field.

* * * * *